R. J. SMITH.
COLLAPSIBLE HOG CHUTE.
APPLICATION FILED JUNE 23, 1913.
1,105,004.
Patented July 28, 1914.
2 SHEETS—SHEET 1.
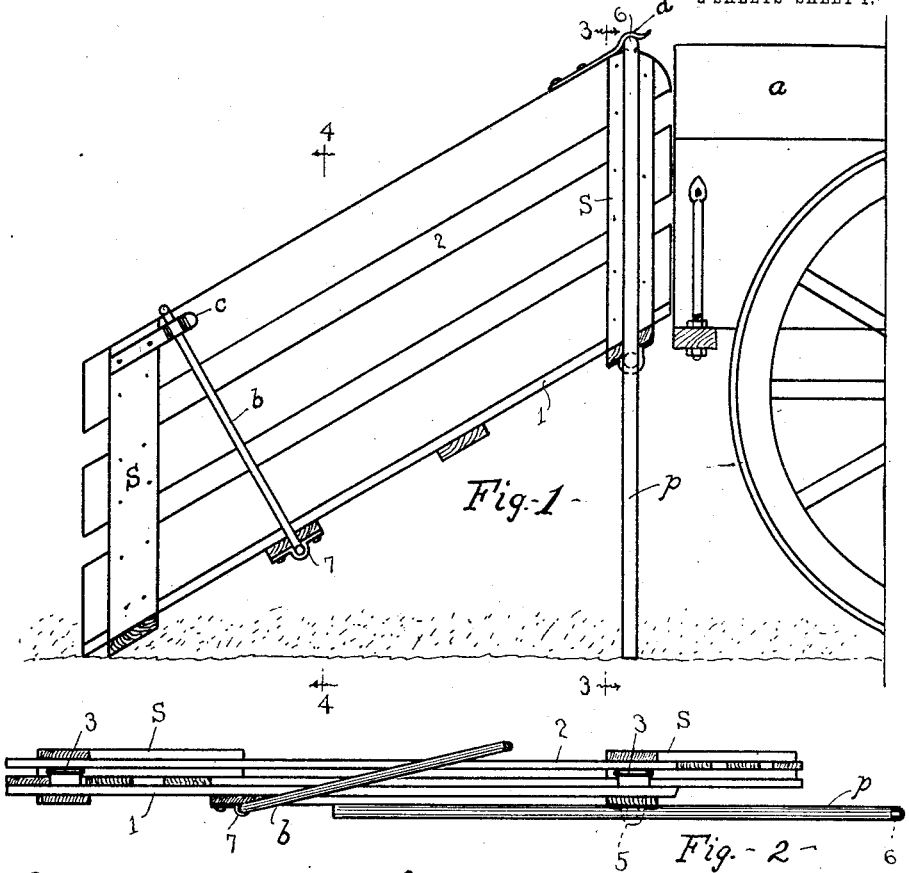
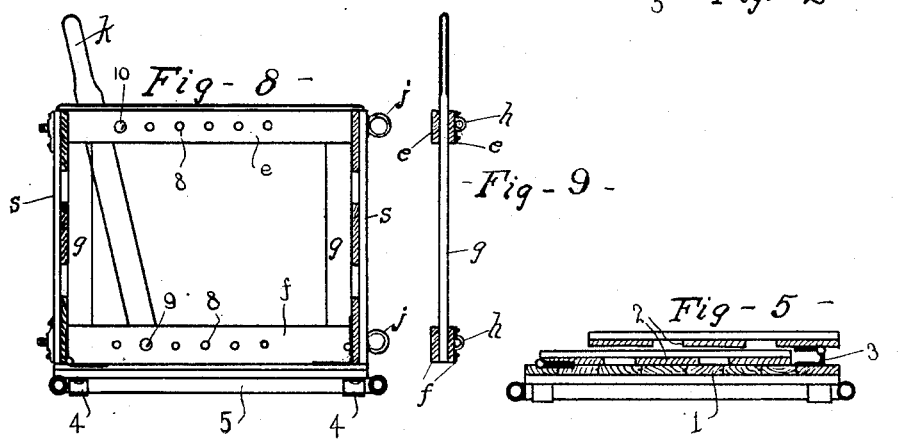
WITNESSES:
C. Furman
F. H. Coburn
INVENTOR.
Raymond J. Smith
BY
H. B. Willson & Co
Attorneys

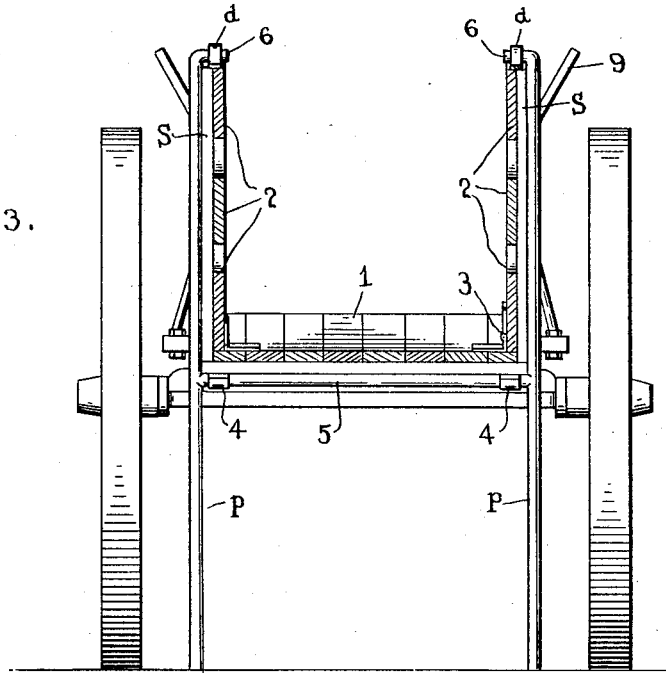

UNITED STATES PATENT OFFICE.

RAYMOND J. SMITH, OF CATLIN, ILLINOIS.

COLLAPSIBLE HOG-CHUTE.

1,105,004.

Specification of Letters Patent.

Patented July 28, 1914.

Application filed June 23, 1913. Serial No. 775,392.

*To all whom it may concern:*

Be it known that I, RAYMOND J. SMITH, a citizen of the United States, residing at Catlin, in the county of Vermilion and State of Illinois, have invented certain new and useful Improvements in Collapsible Hog-Chutes; and I do declare the following to be a full, clear, and exact description of the invention, such as will enable others skilled in the art to which it appertains to make and use the same.

This invention relates to improvements in hog chutes.

One object of the invention is to provide a chute of this character which when not in use may be folded into close compact form and which may be readily set up and firmly supported in position for loading hogs or other stock into wagons, cars or the like, and for unloading stock therefrom.

Another object is to provide a collapsible chute having means whereby the same may be employed as a trap for holding hogs or other stock while being ringed or operated on.

With these and other objects in view, the invention consists of certain novel features of construction and the combination and arrangement of parts as will be more fully described and claimed.

In the accompanying drawings: Figure 1 is a side view of my improved chute and a portion of the rear end of a wagon illustrating the chute set up in position for use. Fig. 2 is a side view of the chute in collapsed or folded position; Fig. 3 is a vertical cross section of the chute taken on the line 3—3 of Fig. 1; Fig. 4 is a similar view taken on the line 4—4 of Fig. 1. Fig. 5 is an end view of the chute in folded position. Fig. 6 is a detail perspective view of the supporting frame of the chute; Fig. 7 is a similar view of the side supporting frame of the chute; Fig. 8 is a cross sectional view through the chute showing the same arranged as a trap and as having applied thereto means for firmly supporting the animal therein. Fig. 9 is a vertical cross section of the holding means removed from the chute.

My improved hog chute comprises a bottom 1 to the upper side of which adjacent to its side edges are hinged folding sides 2. The sides 2 comprise a series of slats which are connected near their ends by cross pieces or cleats S. One of the sides 2 is connected to the bottom 1 by hinges 3, the bottom engaging members of which are bent at right angles to offset the joint of the hinge some distance above the bottom of the chute so that this side thereof will fold down onto the other side after the latter has been folded against the bottom of the chute as clearly indicated in Fig. 5 of the drawings.

Pivotally connected to the lower side of the bottom near the upper end of the chute by clips 4 is a supporting frame comprising vertical standards $p$ which are connected intermediate their ends by a cross bar 5 which engages the clips 4 as shown. The standards $p$ when in an operative position have their upper ends disposed adjacent to the sides 2 and on the upper ends of the standards $p$ are formed inwardly turned catch lugs 6 which are adapted to engage spring catches $d$ arranged on the upper edges of the sides 2 when the supporting frame is swung to an operative position as is clearly illustrated in Fig. 1 of the drawings.

The sides 2 when open to form the chute are held in this position by a bail or U-shaped side supporting frame $b$ the lower cross bar of which is pivotally connected to the bottom of the trough by clips 7 while the side members thereof are swung upwardly adjacent to the outer surface of the sides and have their upper ends engaged with spring catches $c$ secured to the upper end of the lower cleats S as is clearly shown in Fig. 1 of the drawings. The side members of the frame $b$ when thus engaged with the spring catches $c$ securely hold and support the sides 2 in an open or operative position. When the chute is thus set up and the parts secured in the manner described, the upper end of the chute may be placed against the end of a wagon body 9 as shown in Fig. 1 or engaged with the door opening in the side of a car or connected with any other inclosure as will be readily understood.

When it is desired to use the chute as a trap for confining and holding animals while being operated on as for instance for securely holding hogs while being ringed, I provide a holding device comprising a frame consisting of upper and lower pairs of cross bars $e$ and $f$ between the ends of which are secured the upper and lower ends of vertical side bars $g$ said bars $e$, $f$, and $g$, thus forming a rectangular frame the outer dimensions of which correspond with the inner dimensions of the chute in which the frame is arranged as clearly shown in Fig. 8 of the drawings. When using the chute as a trap the supporting frame or standards $p$ are folded alongside the bottom and the chute laid flat on the ground as will be readily understood. The frame formed by the bars $e$, $f$ and $g$ is secured in a vertical position in the chute by upper and lower supporting rods $j$ which are inserted through apertures in the slats of the sides 2 and are engaged with eyes or clips $h$ secured to one of the upper and lower cross bars $e$ and $f$ as clearly shown in Fig. 9 of the drawings. In the upper and lower cross bars $e$ and $f$ of the holding frame are formed series of apertures 8 and between said pairs of bars is adjustably and pivotally secured a gripping lever $k$. The lower end of the lever $k$ is adjustably and pivotally secured between the lower pair of bars $f$ by a pin or bolt 9 which is inserted through one of the apertures 8 in said lower cross bars and when thus attached, the upper end of the lever is adapted to be swung toward the opposite side of the frame thus firmly gripping the animal between the lever and this side of the frame. When in this position the lever is held by a pin or bolt 10 which is engaged with one of the apertures 8 in the upper cross bar $e$ on the opposite side of the lever from that which grips the animal as will be readily understood.

When the chute is not in use the frame $b$ is disengaged from the spring catch $c$ and folded downwardly alongside the bottom and the supporting frame or standards $p$ are also folded lengthwise of the bottom after which first one side and then the other of the chute are folded inwardly onto the bottom of the chute as is clearly illustrated in Figs. 2 and 5 of the drawings, thus reducing the chute to a small compact form in which it may be readily carried and placed in an out of the way position when not in use.

From the foregoing description taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as claimed.

Having thus described my invention, what I claim is:

1. A chute of the character described comprising a base, transversely extending cleats secured in spaced relation to the under surface thereof, sides hingedly connected at their lower edges to said base adjacent the outer edges of the latter, each of said sides having one of their corners rounded, clips secured to one of said transverse cleats, an H-shaped supporting member, the latter having its intermediate bar pivotally mounted in said clips and its side members depending downwardly whereby to form supporting standards and projecting upwardly contiguous to said sides whereby to provide supporting arms for the latter, said arms having their extremities extended inwardly and at right angles whereby to overlie the rounded corners of said sides and coact with the latter, and spring clips secured to the upper edge of said sides contiguous to the rounded corners thereof said clips having therein a seat adapted to coact with the right angularly extended extremity of said side supporting members.

2. A chute of the character described comprising a base, transversely extending cleats secured in spaced relation to the under surface thereof, sides hingedly connected at their lower edges to said base adjacent the outer edges of the latter, each of said sides having one of their corners rounded, clips secured to two of said transversely extending cleats, a bail-shaped member including side arms and an intermediate bar, the latter extending through the clips on one of said cleats and the former projecting upwardly contiguous to said sides whereby to support the latter, spring clips secured to said sides, said clips having therein seats adapted to receive the upper extremity of the arms of said bail-shaped member whereby to lock the latter in adjusted position, an H-shaped member having its intermediate bar pivotally mounted in the clips of the other transversely extending cleat, the sides of said H-shaped member depending downwardly to form supporting standards and extending upwardly contiguous to said hinged sides, whereby to form supporting arms for the latter, said arms having their extremities extending inwardly and at right angles to overlie the rounded corners of said sides, and spring clips secured to the upper edges of said sides contiguous to the rounded corners thereof, said clips adapted to coact with the right angularly extending extremities of said supporting arms of the H-shaped member.

In testimony whereof I have hereunto set my hand in presence of two subscribing witnesses.

RAYMOND J. SMITH.

Witnesses:
S. E. BRITTINGHAM,
EDITH LEONARD.

Copies of this patent may be obtained for five cents each, by addressing the "Commissioner of Patents, Washington, D. C."